United States Patent [19]

Satoh et al.

[11] Patent Number: 4,984,230
[45] Date of Patent: Jan. 8, 1991

[54] REWRITABLE OPTICAL DISK WITH DEFECTIVE-SECTOR SUBSTITUTION ARRANGEMENT AND OPTICAL INFORMATION RECORDING AND REPRODUCING SYSTEM

[75] Inventors: Isao Satoh, Neyagawa; Yoshihisa Fukushima, Osaka; Yuji Takagi, Kadoma; Yasushi Azumatani, Neyagawa, all of Japan

[73] Assignee: Matsushita Electric Industrial Co., Ltd., Osaka, Japan

[21] Appl. No.: 465,542

[22] Filed: Dec. 21, 1989

Related U.S. Application Data

[63] Continuation of Ser. No. 128,178, Dec. 3, 1987, abandoned.

[30] Foreign Application Priority Data

Dec. 19, 1986 [JP] Japan ............................ 61-304272
Dec. 19, 1986 [JP] Japan ............................ 61-304273

[51] Int. Cl.$^5$ .................................................. G11B 7/00
[52] U.S. Cl. .............................................................. 369/54
[58] Field of Search ....................................... 369/54, 47

[56] References Cited

U.S. PATENT DOCUMENTS

| | | | |
|---|---|---|---|
| 4,405,952 | 9/1983 | Slakmon | 360/49 |
| 4,434,487 | 2/1984 | Rubinson et al. | 360/53 |
| 4,477,890 | 10/1984 | Mooney et al. | 369/54 |
| 4,631,723 | 12/1986 | Rathbun et al. | 360/47 |
| 4,638,472 | 1/1987 | Ogara et al. | 369/54 |
| 4,656,532 | 4/1987 | Greenberg et al. | 360/48 |
| 4,677,606 | 6/1987 | Ogata et al. | 369/59 |
| 4,746,998 | 5/1988 | Robinson et al. | 360/49 |
| 4,754,345 | 6/1988 | Karlstetter | 360/49 |
| 4,774,700 | 9/1988 | Satoh et al. | 360/53 |
| 4,791,622 | 12/1988 | Clay et al. | 369/54 |
| 4,811,124 | 3/1989 | Dujari et al. | 360/49 |
| 4,821,254 | 4/1989 | Satoh et al. | 369/54 |

FOREIGN PATENT DOCUMENTS 3403290 8/1985 Fed. Rep. of Germany .

OTHER PUBLICATIONS

Havant GB, "Disk File Defect Strategy," Research Disclosure, No. 267, p. 424, Jul. 1986.
Patent Abstracts of Japan, vol. 10, No. 169 (P-468)(2225), Jun. 14 1986 and JP-A-61 020271 (Matsushita Denki Sangyo KK.), Jan. 29, 1986.

*Primary Examiner*—Vincent P. Canney
*Attorney, Agent, or Firm*—Stevens, Davis, Miller & Mosher

[57] ABSTRACT

An optical information recording and reproducing apparatus irradiates a laser beam to an optical disk for repeatedly recording and reproducing data on and from data sectors of the optical disk. The optical disk comprises a plurality of track blocks each comprising data sectors for recording data thereon, alternate sectors for substituting defective ones of the data sectors, and at least one mapping sector for recording mapping data representing the address correspondence between the defective sectors and the alternate sectors substituting the defective sectors. The optical information recording and reproducing apparatus comprises a recording and reproducing circuit for recording and reproducing data on and from the data sectors, an error control circuit for correcting an error occurred in any one of data, a defective sector detecting circuit for detecting a defective sector, a memory for storing mapping data, and a sector substituting circuit for substituting a defective sector by one of the alternate sectors. Mapping data representing the correspondence between the address information of the defective sector and that of the alternate sector substituting the defective sector is recorded on the mapping sector in the same block, and, at the time of data reproduction or data re-writing, the address information of the alternate sector is detected from the mapping sector of the block to which the alternate sector belongs, so that the data can be reproduced from or re-written on the alternate sector at a high speed.

11 Claims, 5 Drawing Sheets

REWRITABLE OPTICAL DISK WITH DEFECTIVE-SECTOR SUBSTITUTION ARRANGEMENT AND OPTICAL INFORMATION RECORDING AND REPRODUCING SYSTEM

This application is a continuation of application Ser. No. 128,178, filed Dec. 3, 1987, now abandoned.

BACKGROUND OF THE INVENTION

This invention relates to an erasable optical disk and an optical information recording and reproducing apparatus recording and reproducing information by irradiating a laser beam to the optical disk, and more particularly to management of a defective sector of the optical disk.

Figure 4:
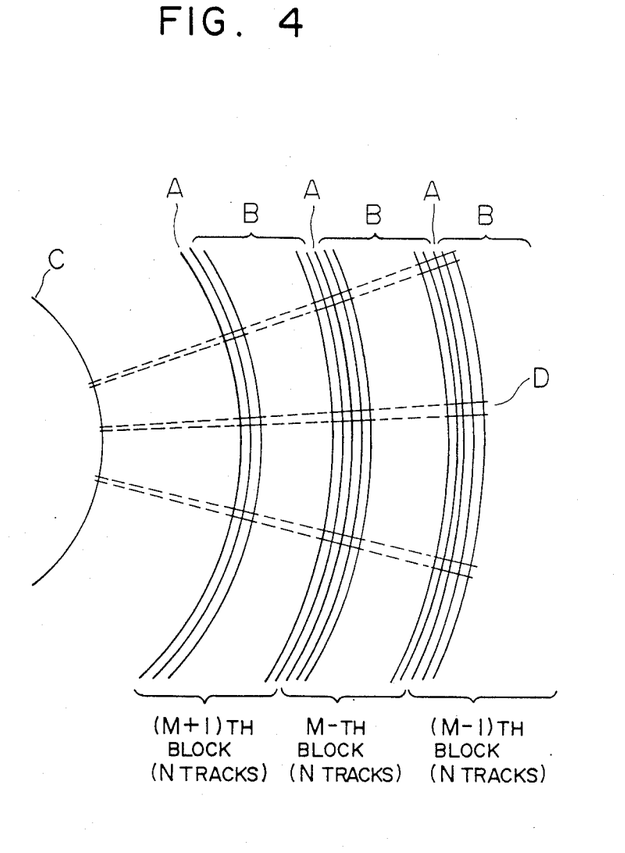
FIG. 4 shows an arrangement of alternate tracks in a prior art optical disk.
Figure 5:
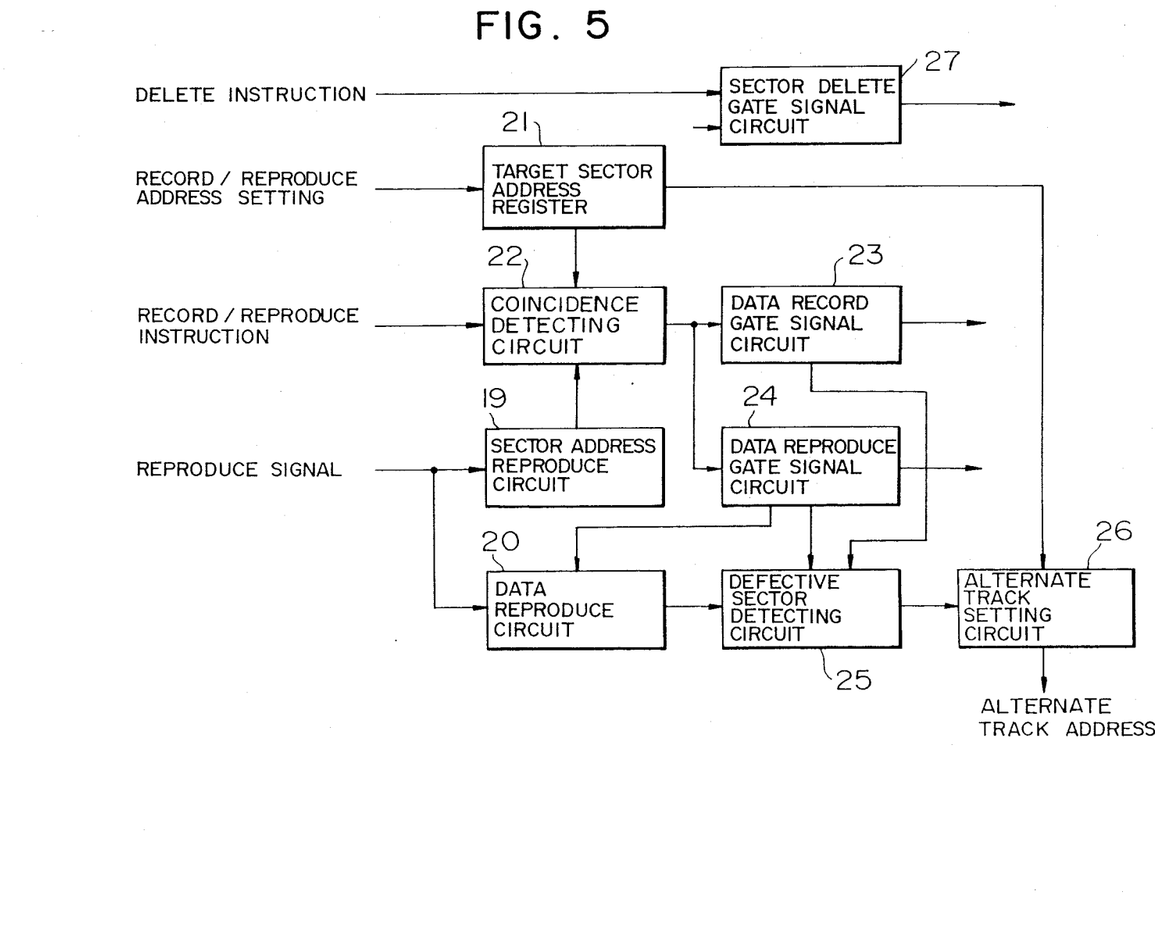
FIG. 5 is a block diagram of an optical information recording and reproducing apparatus using the optical disk having the alternate track arrangement shown in FIG. 4.

A method of managing a defective data sector of an optical disk is disclosed in, for example, JP-A-61-20271. FIG. 4 shows the arrangement of alternate tracks in the optical disk. Referring to FIG. 4, the optical disk includes alternate tracks A, ordinary tracks B for recording data, a secondary alternate track area C, and sector identifier fields D having addresses recorded thereon. FIG. 5 is a block diagram of an optical information recording and reproducing apparatus for recording and reproducing information on and from the optical disk including the alternate tracks shown in FIG. 4. Referring to FIG. 5, the optical information recording and reproducing apparatus includes a sector address reproducing circuit 19, a data reproducing circuit 20, a target sector address register 21, a sector address coincidence detecting circuit 22, a data recording gate signal circuit 23, a data reproducing gate signal circuit 24, a defective sector detecting circuit 25 for detecting a defective sector, an alternate track setting circuit 26, and a sector deleting gate signal circuit 27 for writing an identification mark on a defective sector.

In the optical information recording and reproducing apparatus having the structure described above for recording and reproducing information on and from the above-mentioned optical disk having the track assignment shown in FIG. 4, a coincidence signal is generated from the sector address coincidence detecting circuit 22 when the output signal of the target sector address register 21 is coincident with that of the sector address reproducing circuit 19. The coincidence signal generated from the sector address coincidence detecting circuit 22 is applied to the data recording gate signal circuit 23 or the data reproducing gate signal circuit 24, and, in response to the application of the output signal of the data reproducing circuit 20 or that of the data recording gate signal circuit 23 or that of the data reproducing gate signal circuit 24, the defective sector detecting circuit 25 detects a defective sector by detecting, for example, a sector address error of the sector identifier field or an error syndrome detected as a result of decoding an error detecting and correcting code in the data reproducing circuit 20. When such a defective sector is detected, the alternate track setting circuit 26 calculates the alternate track associated with the data track to which the defective sector belongs, and data on the defective sector is recorded on an unused sector of the alternate track. Then, the sector deleting gate signal circuit 27 overwrites a delete signal on the data field of the defective sector. In the reproducing operation, this delete signal overwritten on the data field of the defective sector is detected to indicate that the defective sector is substituted by one of the sectors of the alternate track.

Thus, in the above-mentioned optical disk, such an alternate track is provided to each of track blocks so as to shorten the time required for access to any one of the alternate tracks.

When the optical disk having the track assignment described above is of the erasable optical disk in which data is repeatedly erased and recorded on the same data sector, the defective sector detecting circuit 25 can detect a defective sector by detecting an address error of the sector address identifier field. However, when the defect exists in the data field of the defective sector, data is recorded on the data field of the defective sector because the delete signal recorded on the data field cannot be detected before the sector address in the sector address identifier field is detected. Consequently, the above type optical disk has had such a problem that the alternate operation of the same defective sector performance again, and, due to this requirement, an extra processing time for this operation is additionally required, resulting in a reduced speed for access.

SUMMARY OF THE INVENTION

With a view to solve the problems described above, it is an object of the present invention to provide an optical disk having a mapping sector in which the correspondence between the address of a defective sector and the address of an alternate sector substituting the defective sector is recorded as mapping data, so as to improve the speed of processing for substituting the defective sector by the alternate sector. Another object of the present invention is to provide an optical information recording and reproducing apparatus using such an optical disk.

In accordance with the present invention, there is provided an optical disk adapted for recording and reproducing data on and from tracks each of which is divided into a plurality of sectors, the optical disk comprising a plurality of track blocks each comprising data sectors for recording data thereon, alternate sectors for substituting a defective one of the data sectors by one of the alternate sectors, and at least one mapping sector for recording mapping data representing the address correspondence between the defective sector and the alternate sector substituting the defective sector. Further, in accordance with the present invention, there is provided an optical information recording and reproducing apparatus using the optical disk described above, the apparatus comprising recording and reproducing means for recording and reproducing data on and from the sectors of the optical disk, error control means for adding an error detecting and correcting code to data for detecting and correcting an error occurred in any one of data, defective sector detecting means for detecting a defective sector in any one of the blocks, memory means for storing the mapping data recorded on the mapping sector, and sector substituting means responsive to detection of the presence of a defective sector in one of the blocks by the defective sector detecting means for substituting the detected defective sector by one of the alternate sectors in the same block on the basis of the mapping data stored in the memory means.

Thus, in the present invention in which the optical information recording and reproducing apparatus having the structure described above uses the optical disk having the sector assignment described above, mapping data representing the correspondence between address information of a defective sector in one of the blocks and address information of an alternate sector substituting the defective sector is recorded in a mapping sector in the same block, so that, at the time of data reproduction or data re-writing, the address information of the alternate sector can be obtained from the mapping sector of the block to which the alternate sector belongs, and the data can be reproduced from or re-written on the alternate sector at a high speed.

DESCRIPTION OF THE PREFERRED EMBODIMENTS

Figure 1:
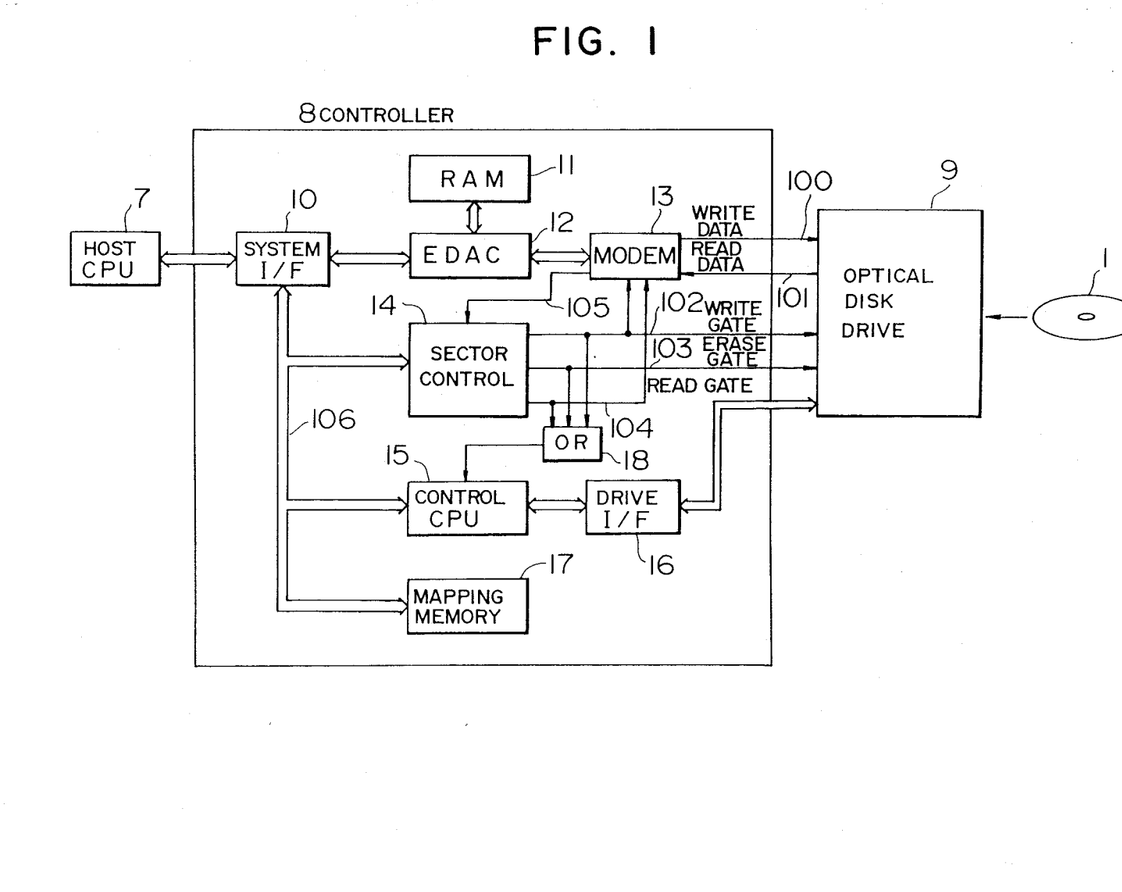
FIG. 1 is a block diagram of a preferred embodiment of the optical information recording and reproducing apparatus according to the present invention.

FIG. 1 is a block diagram of a preferred embodiment of the optical information recording and reproducing apparatus of the present invention for recording and reproducing data on and from an embodiment of the optical disk of the present invention. Referring to FIG. 1, the optical information recording and reproducing apparatus embodying the present invention comprises a host CPU 7, a controller 8 and an optical disk drive (referred to hereinafter simply as a drive) 9. The drive 9 and the controller 8 act as an external data storage of the host CPU 7. The controller 8 connects the drive 9 to the host CPU 7, and the drive 9 drives an optical disk 1 for recording and reproducing data on and from the optical disk 1. The controller 8 includes a system interface 10 between the host CPU 7 and the controller 8, a random access memory (RAM) 11 for temporarily storing data and an error detecting and correcting code added to the data, an error detecting and correcting circuit (EDAC) 12 generating the error detecting and correcting code for correcting an error occurred in reproduced data, and a data modulating and demodulating circuit (MODEM) 13 in which coded data provided by adding the error detecting and correcting code to data supplied from the host CPU 7 is modulated and applied as write data 100 to the optical disk 1 through the drive 9, and in which read data 101 reproduced from the optical disk 1 through the drive 9 is demodulated. The controller 8 further includes a sector read/write control circuit 14 for detecting the address of a target sector and generating signals for starting writing, reading and erasing, a control CPU 15 for controlling the operation of the controller 8, an interface 16 between the drive 9 and the controller 8, a mapping memory 17 for storing mapping data read out from any one of mapping sectors of the opticak disk 1, and an OR circuit 18. A write gate 102, an erase gate 103 and a read gate 104 are generated from the sector read/write control circuit 14. The write gate 102 indicates that the write data 100 is valid, the erase gate 103 instructs to erase data recorded on the optical disk 1, and the read gate 104 instructs the data modulating and demodulating circuit 13 to start its data demodulating operation. The write gate 102, erase gate 103 and read gate 104 are applied also to the OR circuit 18. A reproduced address signal 105 is applied from the data modulating and demodulating circuit 13 to the sector read/write control circuit 14. The control CPU 15 has a CPU data bus 106 connected thereto. The drive 9 includes a semiconductor laser drive circuit.

Figure 2:
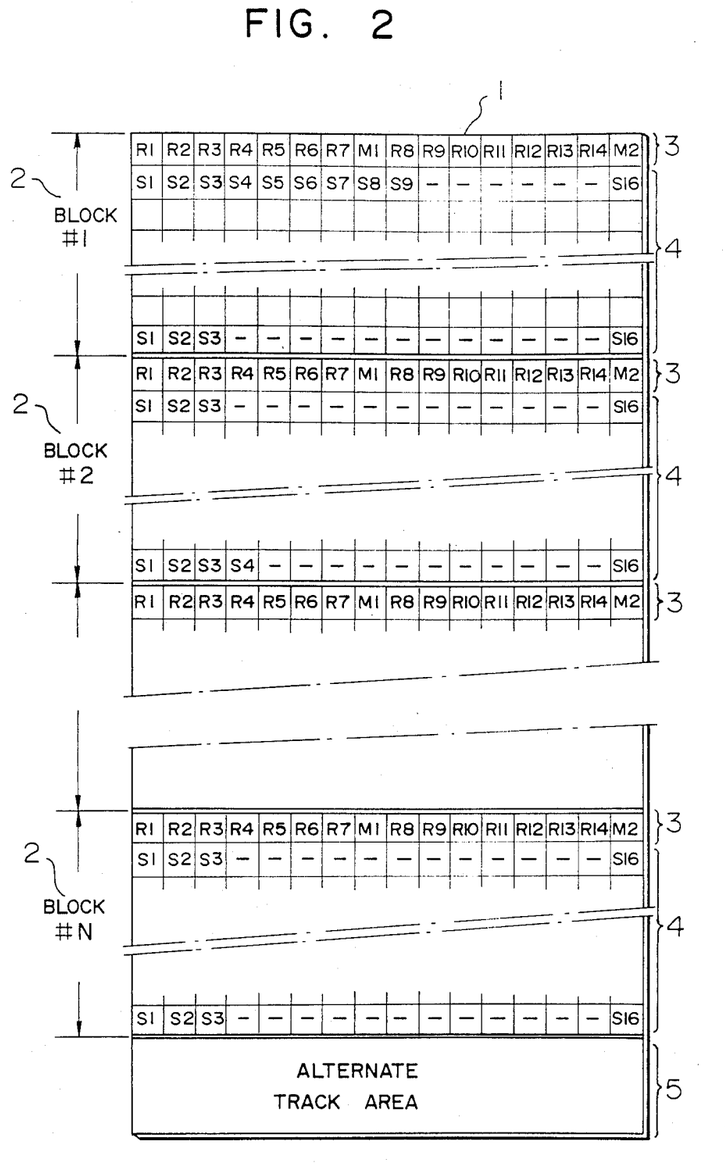
FIG. 2 is a structural diagram of a first embodiment of the optical disk preferably used in the apparatus of the present invention shown in FIG. 1.

FIG. 2 is a structural diagram of a first embodiment of the optical disk 1 shown in FIG. 1. Referring to FIG. 2, the optical disk 1 includes a plurality of track blocks 2 (block #1 to block #N) and an alternate track area 5. Each track block 2 includes a block managing track 3 comprising of alternate sectors R (R1 to R14) and mapping sectors M (M1 and M2), and a plurality of data tracks 4 each including data sectors S (S1 to S16). The alternate track area 5 includes alternate tracks including sectors for substituting defective sectors when the number of defective ones of the data sectors S exceeds the number of the alternate sectors R (R1 to R14) in each track block 2. In FIG. 2, data are recorded on and reproduced from the data sectors S (S1 to S16) in each track block 2. When there is a defective sector among those data sectors S in one track block 2, the defective sector is substituted by one of the alternate sectors R (R1 to R14) in the same block 2, and mapping data representing the correspondence between the address information of the defective sector S and the address information of the alternate sector R substituting the defective sector S is recorded on one of the mapping sectors M (M1 and M2) in the same block 2.

The operation of the optical information recording and reproducing apparatus of the present invention using the optical disk 1 having the structure shown in FIG. 2 will now be described.

The track block #1 to the track block #N of the optical disk 1 are initially formated, and test data are recorded on and reproduced from all the data sectors S of each block 2 so as to check the presence or absence of address errors, data errors or defects in the data fields. When a defective sector is substituted by an alternate sector, mapping data is recorded on one of the mapping sectors M (M1 and M2). The presence of an address error in the sector identifier field is detected by setting a target sector address and one of write/erase/read commands in the sector read/write control circuit 14 and checking the output of the OR circuit 18 by the control CPU 15. When the output of the OR circuit 18 is detected, the target sector address is normal, while when the output of the OR circuit 18 is not detected, there is an address error in the sector identifier field. A data error present in the data field is detected by reading out data recorded on the data field and decoding the error detecting and correcting code added to the data to detect the error syndrome. A defect present in the data field is detected by reproducing signals from unused sectors, converting the signals into binary signals relative to a threshold level and detecting the width and number of the binary signals.

The mapping data includes the addresses of defective sectors, the addresses of alternate sectors substituting the defective sectors, the management information to indicate whether each alternate sector is used or not, the management information to indicate whether each sector in the alternate track area is used or not, etc.

The total number of the tracks constituting all the blocks is selected to permit high-speed retrieval of data by considering the operating characteristic of a retrieval mechanism associated with the optical disk.

In order to improve the access time of the alternate processing, the range of a block is decided by considering the dynamic range of the optical actuator. Because the drive unit performs only the fine seek operation with the high speed but has no need to use the coarse seek operation by the linear motor.

The data recording operation of the optical information recording and reproducing apparatus embodying the present invention will now be described.

(1) The host CPU 7 applies a write command to the system interface 10. The write command comprises device command blocks (DCB) including the address of a target sector, the number of sectors to be written, a write operation code, etc.

(2) The control CPU 15 in the controller 8 receives the DCB from the system interface 10 and instructs the drive 9 to seek the head track of the block 2 to which the target sector belongs. (In FIG. 1, blocks representing a retreival system, a control CPU and a drive control interface in the drive 9 are not shown.)

(3) Upon completion of the track retrieval, the control CPU 15 in the controller 8 reads out mapping data from the mapping sector M1 and stores the mapping data in the mapping memory 17. If the mapping data stored in the mapping sector M1 includes an error, the control CPU 15 reads out mapping data from the mapping sector M2.

(4) Upon completion of storage of the mapping data in the mapping memory 17, data to be recorded is transferred from the host CPU 7 to the RAM 11 through the system interface 10.

(5) The error detecting and correcting circuit 12 adds an error detecting and correcting code to the data transferred from the host CPU 7 to the RAM 11.

(6) The control CPU 15 instructs the drive 9 to seek the track to which the target sector belongs, and the target sector address and write instruction are set in the sector read/write control circuit 14.

(7) After the sector read/write control circuit 14 detects the address of the target sector, the write gate 102 is applied from the sector read/write control circuit 14 to the data modulating and demodulating circuit 13 and also to the drive 9. The coded data read out from the RAM 11 is modulated, and the write data 100 is supplied from the data modulating and demodulating circuit 13 to the drive 9. In response to the application of the write gate 102, the semiconductor laser drive circuit in the drive 9 is placed in its record mode, and the laser beam is modulated by the write data 100 to record the data on the target sector.

(8) Prior to recording the data on the target sector, whether this sector is defective or not is checked by reference to the mapping data stored in the mapping memory 17. If this target sector is defective, the address of its alternate sector is detected from the mapping data, and the coded data from the RAM 11 is recorded on the alternate sector in the same block. When all the alternate sectors in that block have already been used for data recording, an unused sector in the alternate track area 5 is allocated to serve as the alternate sector. The mapping memory 17 is updated, and the mapping data in the corresponding mapping sector M1 or M2 is updated.

The sequence described above completes the data recording operation. The data reproducing operation of the optical information recording and reproducing apparatus of the present invention will now be described.

(1) The host CPU 7 applies a read command to the system interface 10. The read command comprises device command blocks (DCB) including the address of a target sector, the number of sectors to be read, a read operation code, etc.

(2) When the control CPU 15 in the controller 8 receives the DCB through the system interface 10, the controller 8 instructs the drive 9 to seek the specified track in which the mapping data of the block 2 is written.

(3) At the completion of the seek operation, the control CPU 15 in the controller 8 reads out mapping data from the mapping sector M1 and stores the mapping data in the mapping memory 17. If the mapping data stored in the mapping sector M1 includes an error, the control CPU 15 reads out mapping data from the mapping sector M2.

(4) At the completion of storage of the mapping data in the mapping memory 17, the controller 8 calculates the track to which the target sector belongs and instructs the drive 9 to seek the addressed track.

(5) The control CPU 15 sets the target sector address and read instruction in the sector read/write control circuit 14. Prior to reproducing the data recorded on the target sector, whether this sector is defective or not is checked by reference to the mapping data stored in the mapping memory 17. If this target sector is defective, the address of its alternate sector is detected from the mapping data, and the data recorded on the alternate sector is read out.

(6) After the target sector is detected, the sector read/write control circuit 14 applies the read gate 104 to the data modulating and demodulating circuit 13 and also to the drive 9. The read data 101 is supplied through the drive 9 to the data modulating and demodulating circuit 13, and the demodulated data is stored in the RAM 11.

(7) The error detecting and correcting circuit 12 detects and corrects an error, if any, of the demodulated data stored in the RAM 11, and the data is stored in the RAM 11 again.

(8) The error-free data stored in the RAM 11 is transferred to the host CPU 7 through the system interface 10.

The above sequence completes the data reproducing operation.

A data sector of the optical disk tends to become defective due to degradation of the recording film as a result of repeated recording or due to attachment of dust and dirt in an environment in which the optical disk is used. Therefore, immediately after data has been recorded on a data sector, the recorded data is read out from the data sector, and the quality of the recorded data is inspected by decoding the error detecting and correcting code thereby detecting the error syndrome. If the data recorded on the data sector includes an error exceeding a predetermined reference level, this data sector is decided to be a defective sector and is substituted by its alternate sector.

In order to guarantee the data reliability on the read-verify operation, the read data 101 is reproduced under more severe conditions and the data error is distinguished by using the more strict criteria.

Then, the data recorded on the defective sector is transferred to an unused alternate sector belonging to the same block, and the content of the mapping memory 17 is updated, and new mapping data is recorded on the mapping sector. As the result of this, the mapping data recorded on the mapping sector represents always the address correspondence between the data sector and the alternate sector. Further, when the management information is recorded adding to the mapping data in the mapping sector to indicate whether each alternate sector is used or not, the information makes it easy to immediately determine the alternate sector to be next applied during the write operation. In each of the blocks, the number of tracks is preferably selected to be a multiple of ten so that the optical head actuator can make access to those tracks at a high speed. When the number of tracks in each block is so selected, one or two mapping sectors can sufficiently register not only an initially defective sector or sectors but also an alternate sector or sectors selected to substitute the defective sector or sectors during the operation of the optical information recording and reproducing apparatus. Further, since only one or two mapping sectors are required, a small-capacity memory, for example, the mapping memory 17 provided in the controller 8 can sufficiently easily manage the mapping data.

Suppose, for example, that the number of tracks in each block is 64 tracks/block, the capacity of each sector is 1,024 bytes/sector, and the mapping data requires 3 bytes for defective sector address representation and 3 bytes for alternate sector address representation. In this case, the mapping sectors can accommodate the addresses of as many as about 170 defective sectors, and this means that a defective sector rate up to $170/1,024 = 16.6\%$ can be dealt with. This value includes a practically sufficient margin.

Figure 3:
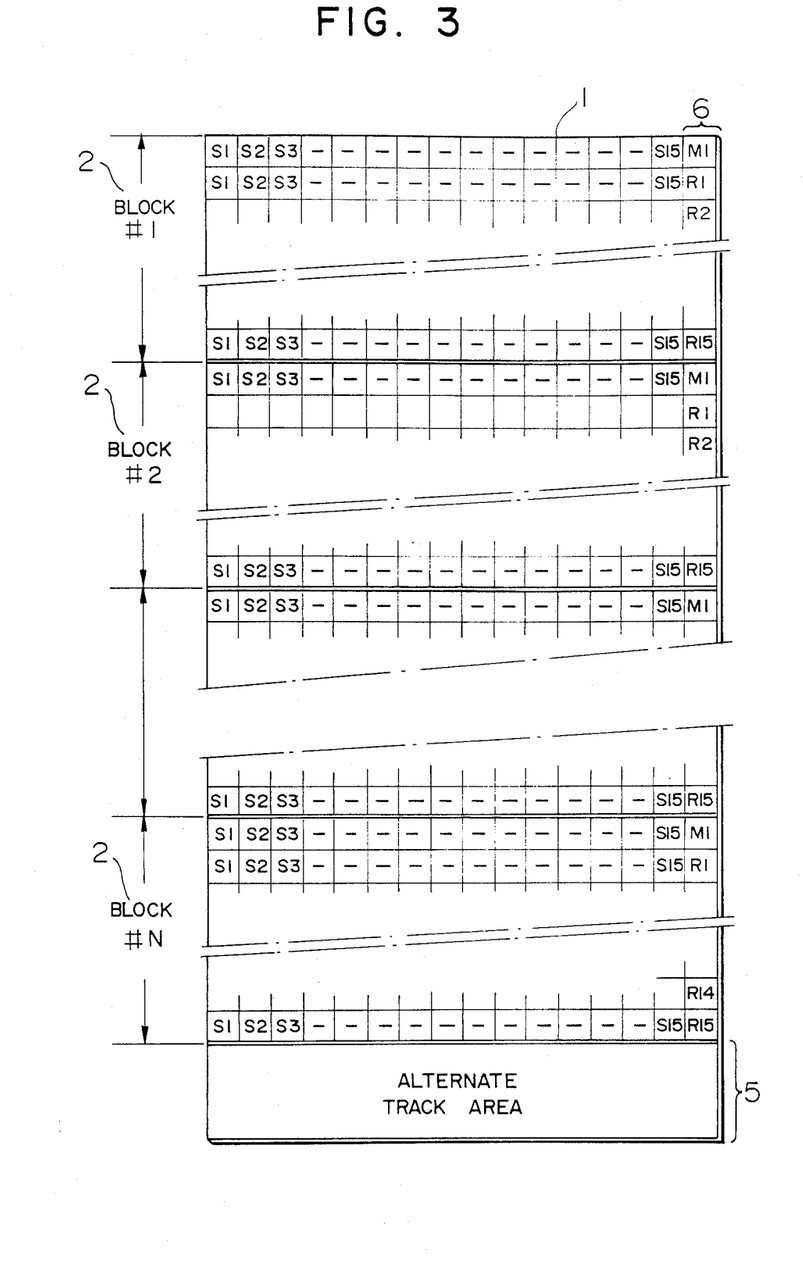
FIG. 3 is a structural diagram of a second embodiment of the optical disk preferably used in the apparatus of the present invention.

FIG. 3 is a structural diagram of a second embodiment of the optical disk preferably used in the present invention. As in FIG. 2, the optical disk is generally designated by the reference numeral 1, and the reference numerals 2 and 5 designate track blocks and an alternate track area respectively. The reference numeral 6 designates block managing sectors comprising of a mapping sector M (M1) and alternate sectors R (R1 to R15). Thus, in the optical disk 1 shown in FIG. 3, each of the track blocks 2 (#1 to #N) includes data sectors S (S1 to S15) for recording and reproducing data thereon and therefrom, alternate sectors R (R1 to R15) for substituting defective ones of these data sectors S, and a mapping sector M (M1) for managing the address correspondence between the defective sectors S and the alternate sectors R substituting the defective sectors.

In FIG. 3, the alternate sectors R (R1 to R15) are allocated at a rate of one for each of the tracks. In view of the fact that the probability of erroneous sectors having uncorrectable errors is in the order of $10^{-8}$ to $10^{-10}$, the number of defective sectors that must be substituted by alternate sectors is one sector per track at the most in most of the blocks. Therefore, in the optical disk 1 shown in FIG. 3, substitution of a defective sector S by the alternate sector R in one track can be made at a high speed, since there is no need for seeking the block managing track 3 of the optical disk 1 shown in FIG. 2.

In each of the embodiments of the optical disk shown in FIGS. 2 and 3, the mapping data stored in the mapping sector is most important for the management of the optical disk. Therefore, it is preferable to allocate a plurality of sectors in each track block as mapping sectors, taking into consideration the reliability of data and possible system down drop-out due to, for example, power supply interruption during recording the mapping data.

As described above, defective sectors are managed by one or two mapping sectors in each track block of the optical disk. Therefore, the mapping memory 17 in the controller 8 is not required to have a large capacity, and its required capacity is as small as that corresponding to one or two sectors. Further, it is possible to improve the access time of the alternate processing. Because the drive 9 performs the fine seek operation with the high speed.

It will be apparent from the foregoing detailed description that the optical disk of the present invention is divided into a plurality of track blocks, and, in each of the track blocks, at least one mapping sector for recording mapping data representing the address correspondence between defective sectors and alternate sectors substituting the defective sectors is provided so as to attain efficient processing for sector substitution at a high speed. Further, because of the capability of efficient block management, the mapping memory storing the mapping data need not have a large capacity, and the cost of the optical information recording and reproducing apparatus of the present invention can be considerably reduced.

As described above, a defective sector in the optical disk of the present invention can be readily substituted by an alternate sector in the same track block. Therefore, the optical information recording and reproducing apparatus of the present invention can successfully record and reproduce data on and from the optical disk without accompanying errors.

We claim:

1. An optical information processing system comprising an optical disk, an optical disk drive and a disk controller, said disk defining thereon a plurality of tracks divided into a plurality of sectors and being adapted to record and output data from said tracks to and from a host computer, said disk drive for driving said disk to enable recording and reproducing of data on said tracks by selective irradiation of a laser beam on said tracks of the disk, and said controller for connecting said disk drive to the host computer;

said optical disk defining a first division comprising said plurality of tracks arranged in a plurality of management blocks, each of said management blocks comprising:
a data sector portion comprising a plurality of data sectors to record data thereon;
a first alternate sectors portion comprising plural first alternate sectors to substitute for detected defective ones of said data sectors to record data therein which would otherwise be recorded in said detected defective data sectors;
said optical disk defining a second division comprising a second alternate sectors portion comprising plural second alternate sectors to substitute for detected defective ones of said data sectors to record data therein which would otherwise be recorded in detected defective sectors additional to said detected defective data sectors which are substituted by said first alternate sectors of said management blocks; and
each of said management blocks further including a mapping sectors portion comprising at least two mapping sectors recording alternate sector address management information relating to an address relationship between detected defective data sectors and substituted ones of said first and second alternate sectors storing data of the defective sectors;

said controller comprising:

means for recording and reproducing data on and from said data sectors, said first alternate sectors and said second alternate sectors;

error correction means for adding an error correction detection code to data to be recorded on said disk and for detecting and correcting errors in reproduced data;

means for detecting defective ones of said data sectors, memory means for storing said alternate sector address management information, and sector substituting means for performing a defective-data substitution operation by substituting a particular detected defected data sector with a corresponding one of said first and second alternate sectors to enable data recording and reproducing in and from said corresponding one of said first and second alternate sectors in place of said particular detected defective data sector by referring to the alternate sector address management information stored in said memory means;

whereby said controller is adapted to, prior to the data recording/reproducing operation with respect to the data sectors of a particular current one of said management blocks, read said alternate sector address management information from its mapping sectors portion, store said read management information in said memory means, and thereafter effect said data recording/reproducing operation with respect to the data sectors of said current one of said management blocks while enabling said sector substituting means by referring to the management information stored in said memory means.

2. An apparatus according to claim 1, wherein when said defective sector detecting means detects a data sector as a defective sector, said recording and reproducing means records data of the just detected defective sector in either one of said first and second alternate sectors in accordance with the alternate sector address management information stored in said memory means, and verifies proper recording of the data of the just detected defective sector in said either one of said first and second alternate sectors by a read verification to update said management information to be recorded in a corresponding mapping sector portion.

3. An apparatus according to claim 1, wherein said defective sector detecting means causes said defective-data substitution operation per each management block comprising a plurality of tracks which lie within a movable search range of an optical head tracking actuator of said recording and reproducing means.

4. An apparatus according to claim 1, wherein each sector of said data sector portion includes a sector identifier portion recorded with address information, and said defective data sector detecting means detects a defective sector by one of (i) detecting a sector identifier portion reading error for which its address information cannot be read correctly, (ii) detecting a data reading error for which said error correction means detects an error correction incapability on the data reproducing operation, and (iii) detecting a defect in a medium of said optical disk.

5. An apparatus according to claim 1, wherein said disk controller causes, prior to a data recording/reproducing operation to a current management block, said recording and reproducing means to execute a test recording and reproducing operation to said current management block, causes said defective sector detecting means to detect a possible defective sector in order to produce an alternate sector address management information assigning the detected defective sector to an alternate sector, and causes said recording and reproducing means to record the produced management information in the mapping sector portion of said current management block.

6. An apparatus according to claim 1 or 5, wherein said disk controller causes said recording and reproducing means to further record, as a part of the management information in the mapping sector portion of each management block, data indicating whether each of the first and second alternate sectors is one of an unrecorded good alternate sector, a defective alternate sector improper for use, and an already-substituted alternate sector.

7. An apparatus according to claim 1, 5 or 6, wherein said disk controller causes said recording and reproducing means to record the alternate sector address management information of said memory means respectively in the plural sectors of said mapping sector portion.

8. An optical disk for optically writing and reproducing data on and from a plurality of tracks, each of said tracks being divided into a plurality of sectors, said plurality of tracks being divided into a plurality of blocks in order to manage possible defective sectors, said disk comprising:

a plurality of tracks arranged in a plurality of management blocks each comprising a data sector portion comprising a plurality of tracks for recording data thereon, a first alternate sectors portion having alternate sectors for substituting for defective sectors of said data sectors portion, and a mapping sector portion recorded with alternate sector address management information representing address correspondence between detected defective sectors and alternate sectors which have substituted for one of said detected defective sectors in order to record data therein which would otherwise be recorded in said detected defective data sectors; and a second alternate sectors portion having plural tracks for recording therein data of overflow defective data sectors when the total number of defective data sectors exceeds the capacity of said first alternate sectors portion; wherein a number of tracks of said data sector portion is selected so as to enable said alternate sector address management information to be recorded in said mapping sector portion of at most a few sectors.

9. An optical disk according to claim 8, wherein said management blocks are delimited by track boundaries and at least one track of each track block contains at least one mapping sector and a plurality of alternate sectors.

10. An optical disk according to claim 8 or 9, wherein said management blocks are delimited by track boundaries which define each block of tracks so that it resides within a movable search range of an optical head tracking actuator.

11. An optical disk according to claim 8, wherein said mapping sector portion further contains data indicating whether each of the first alternate sectors is one of an unrecorded good alternate sector, a defective alternate sector improper for use, and an already-substituted alternate sector.

* * * * *